United States Patent
Lifson et al.

(10) Patent No.: US 9,494,352 B2
(45) Date of Patent: Nov. 15, 2016

(54) REFRIGERANT SYSTEM WITH CONTROL TO ADDRESS FLOODED COMPRESSOR OPERATION

(75) Inventors: Alexander Lifson, Manlius, NY (US); Jason D. Scarcella, Cicero, NY (US)

(73) Assignee: Carrier Corporation, Farmington, CT (US)

( * ) Notice: Subject to any disclaimer, the term of this patent is extended or adjusted under 35 U.S.C. 154(b) by 2137 days.

(21) Appl. No.: 12/279,075

(22) PCT Filed: Jul. 31, 2006

(86) PCT No.: PCT/US2006/029874
§ 371 (c)(1),
(2), (4) Date: Aug. 12, 2008

(87) PCT Pub. No.: WO2007/106116
PCT Pub. Date: Sep. 20, 2007

(65) Prior Publication Data
US 2009/0013701 A1    Jan. 15, 2009

Related U.S. Application Data

(60) Provisional application No. 60/781,249, filed on Mar. 10, 2006.

(51) Int. Cl.
*F25B 41/00* (2006.01)
*F25B 41/04* (2006.01)
*F25B 49/02* (2006.01)

(52) U.S. Cl.
CPC ............ *F25B 41/043* (2013.01); *F25B 49/02* (2013.01); *F25B 2400/01* (2013.01);
(Continued)

(58) Field of Classification Search
CPC ................... F25B 41/043; F25B 49/02; F25B 2500/26; F25B 2400/01; F25B
(Continued)

(56) References Cited

U.S. PATENT DOCUMENTS 4,506,519 A * 3/1985 Morse et al. ................... 62/190
4,785,639 A * 11/1988 Biagini ........................... 62/132
(Continued)

OTHER PUBLICATIONS

Search Report and Written Opinion for PCT/US06/29874.
Transmittal of International Preliminary Report on Patentability on PCT/US06/29874.

*Primary Examiner* — M. Alexandra Elve
*Assistant Examiner* — Larry Furdge
(74) *Attorney, Agent, or Firm* — Carlson, Gaskey & Olds, PC

(57) ABSTRACT

A suction modulation valve is throttled when conditions in a refrigerant system indicate that an undesirable amount of liquid refrigerant might otherwise be delivered to the compressor. As an example, the throttling would occur at start-up, among other conditions. Throttling the suction modulation valve reduces the amount of refrigerant reaching the compressor and thus ensures that any liquid refrigerant would be likely "boiled off" before raising any problems in the compressor. Other control steps can also be performed to alleviate flooded compressor operation with liquid refrigerant. Such steps, for example, can include actuating heaters, discharge valve throttling, by-passing refrigerant from an intermediate compression point back to suction, controlling the speed of the condenser fan can be performed independently or in combination including the suction modulation valve throttling.

9 Claims, 4 Drawing Sheets

(52) U.S. Cl.
CPC ........ *F25B 2500/26* (2013.01); *F25B 2500/28* (2013.01); *F25B 2600/02* (2013.01); *F25B 2600/0261* (2013.01); *F25B 2600/111* (2013.01); *F25B 2600/2517* (2013.01); *Y02B 30/743* (2013.01)

(58) Field of Classification Search
CPC ........................ 2600/111;F25B 2600/02; F25B 2500/28; F25B 2600/2517; F25B 2600/0261
USPC .............. 62/181, 183, 196.3, 201, 217, 227, 62/228.1
See application file for complete search history.

(56) References Cited

U.S. PATENT DOCUMENTS

| | | | | |
|---|---|---|---|---|
| 5,522,231 | A * | 6/1996 | Kenyon et al. | 62/129 |
| 6,047,556 | A * | 4/2000 | Lifson | 62/196.2 |
| 6,238,188 | B1 * | 5/2001 | Lifson | 417/42 |
| 6,263,694 | B1 * | 7/2001 | Boyko | 62/468 |
| 6,318,100 | B1 * | 11/2001 | Brendel et al. | 62/217 |
| 6,418,740 | B1 * | 7/2002 | Williams et al. | 62/196.3 |
| 6,539,734 | B1 * | 4/2003 | Weyna | 62/126 |
| 6,648,604 | B1 * | 11/2003 | Lifson | 417/53 |
| 7,197,890 | B2 * | 4/2007 | Taras et al. | 62/217 |
| 2006/0179855 | A1 * | 8/2006 | Lifson et al. | 62/160 |
| 2007/0000261 | A1 * | 1/2007 | Flynn et al. | 62/114 |
| 2008/0209930 | A1 * | 9/2008 | Taras et al. | 62/228.1 |
| 2008/0223057 | A1 * | 9/2008 | Lifson et al. | 62/228.4 |
| 2008/0250812 | A1 * | 10/2008 | Lifson et al. | 62/498 |
| 2010/0058799 | A1 * | 3/2010 | Lifson et al. | 62/498 |

* cited by examiner

SUCTION MODULATION
VALVE THROTTLING

EVAPORATOR HEATER

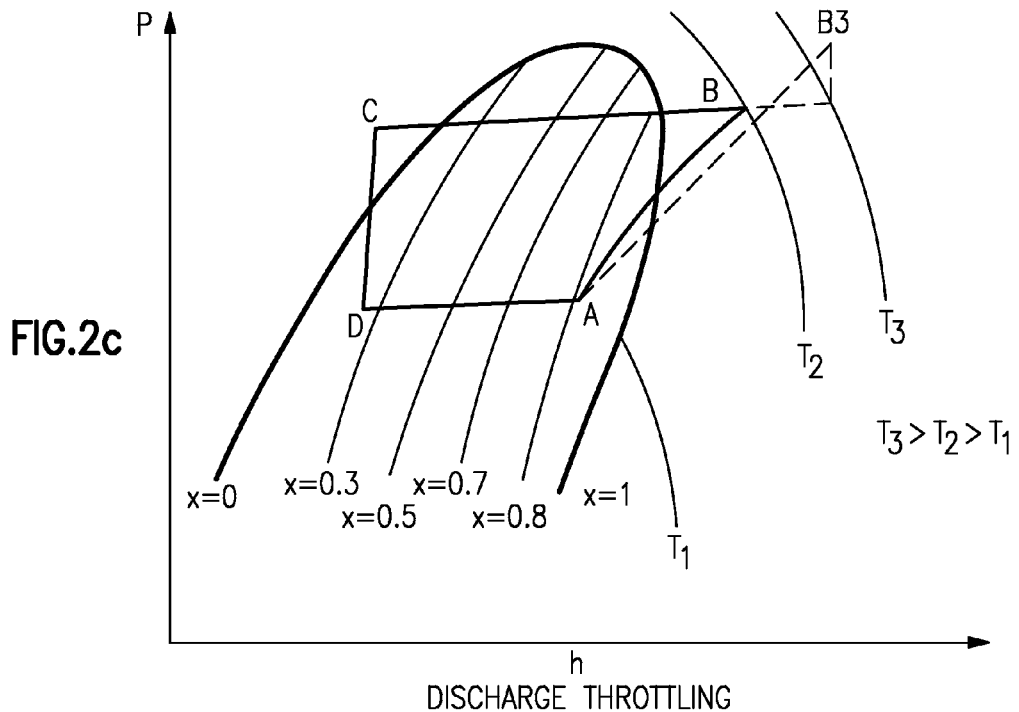
FIG.2c DISCHARGE THROTTLING
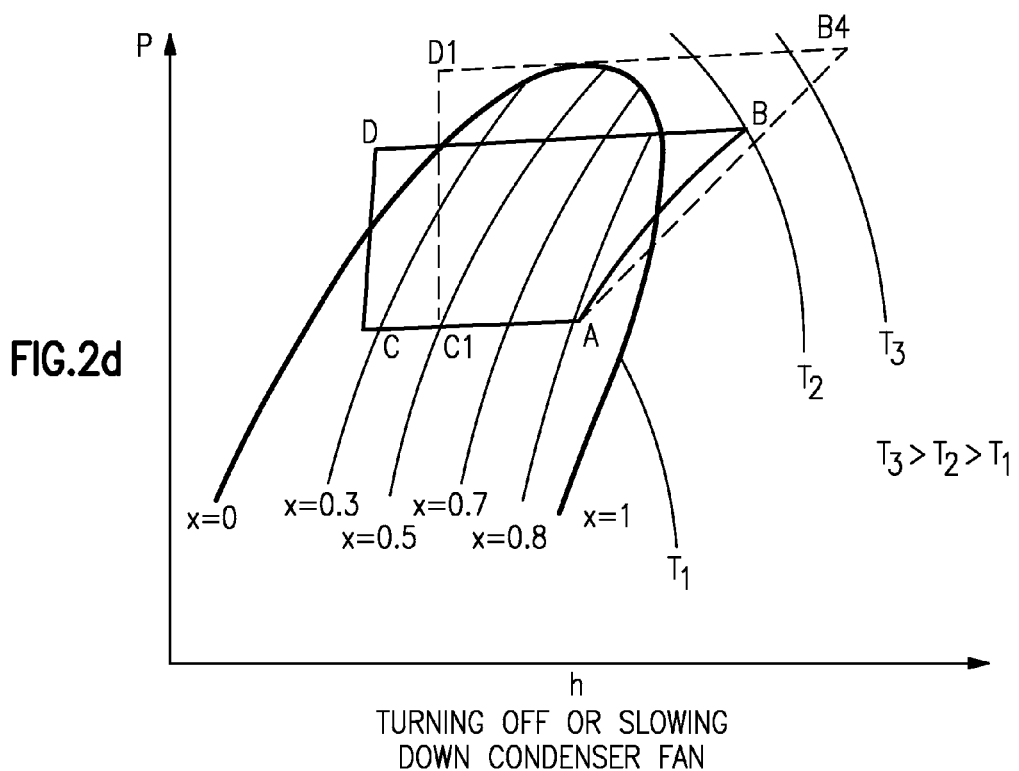
FIG.2d TURNING OFF OR SLOWING DOWN CONDENSER FAN

BY-PASSING REFRIGERANT FROM INTERMEDIATE
COMPRESSION POINT TO SUCTION

REFRIGERANT SYSTEM WITH CONTROL TO ADDRESS FLOODED COMPRESSOR OPERATION

RELATED APPLICATIONS

This application is a United States National Phase application of PCT Application No. PCT/US2006/029874 filed Jul. 31, 2006 which claimed priority to U.S. Provisional Application No. 60/781,249, filed on Mar. 10, 2006.

BACKGROUND OF THE INVENTION

This application relates to a system control technique for eliminating or limiting the amount of liquid refrigerant passing through the compressor. This control technique can, for example, be applied to a suction modulation valve ("SMV") control.

Refrigerant systems are known, and are utilized in applications such as refrigeration, air conditioning or heat pumps. Typically, a compressor compresses a refrigerant and delivers that refrigerant to a downstream condenser. Refrigerant from the condenser passes through an expansion device, and then through an evaporator. From the evaporator, the refrigerant returns to the compressor.

The refrigerant changes state as it moves through the refrigerant system, and at times it may be in a liquid state, a vapor state or a in a two-phase state where both liquid and vapor are present. If too much liquid refrigerant reaches the compressor, undesirable consequences can occur. This condition is known as "flooding." If flooding is not controlled, it can lead to damage to internal compressor elements such as compression element components, couplings, bearings, etc. The potential damage from flooding can be a result of flooding at start-up conditions, or running the compressor flooded during continuous operation. Some degree of flooding on start up may not be avoidable, as refrigerant may leak through the expansion device during an off cycle and collect in the evaporator or compressor sump. When refrigerant builds up in the evaporator during an off cycle the SMV can act as an expansion device. Some degree of flooding can also be present during the continuous compressor operation, for example, due to inability of the expansion device to maintain a vapor phase at the compressor entrance (this can occur for example is the expansion device is oversized for a particular operating condition causing more than a desirable amount of refrigerant to pass through the expansion device). To prevent compressor damage and improve system operation it is desirable to eliminate flooding or reduce the amount of flooding.

SUMMARY OF THE INVENTION

The main embodiment of this invention utilizes an SMV, which is a known component placed between the evaporator and the compressor, and means to control the SMV and other associated components to alleviate the severity of the flooded compressor operation.

To alleviate flooded operation, the control throttles the suction modulation valve to increase the amount of refrigerant quality or superheat entering the compressor, thus decreasing the amount of liquid entering the compressor. The liquid will boil off due to the rise in refrigerant superheat or quality caused by SMV throttling. Also, the SMV throttling will reduce the mass flow of refrigerant entering the compressor (as the SMV throttling causes the reduction in pressure entering the compressor and subsequent reduction in the refrigerant density). As refrigerant enters the compressor it is additionally heated by the heat dissipated by the compressor motor. Since there is less refrigerant entering the compressor if there is throttling, then the refrigerant can be preheated by the motor heat to a higher temperature then if there was no SMV throttling. Additional preheating of the refrigerant by the motor is beneficial, as the heat from the compressor motor will boil off the refrigerant liquid droplets. The SMV throttling also provides additional benefit by increasing the operating pressure ratio (ratio of the compressor discharge pressure to suction pressure) of the compressor (since the suction pressure drops due to throttling while the discharge pressure is only minimally affected by the suction throttling). This increase in the operating pressure results in higher operating temperature during compression, which also helps to boil off any liquid during the compression process). Stated differently, as the compression process begins, the temperature will increase more rapidly then would occur otherwise if there were no throttling, because of a higher pressure ratio operation caused by the throttled SMV.

The severity of flooded operation may be addressed by providing and actuating an evaporator heater and/or a compressor crankcase heater. The heaters would provide additional pre-heating of the refrigerant before it enters the compressor. Additional temperature rise within the compressor can be achieved by throttling the flow of refrigerant at the compressor discharge or intermittently turning off or slowing down the condenser fans. Both discharge throttling and turning off the condenser fans would increase the compressor discharge pressure, which in turn results in higher operating pressure ratio. As described above, the higher operating pressure ratio would increase the refrigerant temperature during the compression process. Higher temperature during the compression process allows for enhanced boiling off of liquid droplets as they enter the compressor compression elements. If the system is equipped with provisions to run a compressor in reverse then that can be done in conjunction with the above mentioned techniques to minimize the amount of flooding by running the compressor in reverse for short period of time by preheating the compressor sump and refrigerant as it enters the compressor shell. Also, if the compressor is provided with a bypass port (bypass can be mid-stage to suction or discharge to suction), the bypass port can be opened on start-up to address the flooded start conditions by additionally heating the colder refrigerant stream that enters the compressor from the evaporator.

The SMV valve can be shut during the off cycle to prevent the compressor being filled with liquid, and then opened (partially or fully) for a very short time at start-up to prevent sudden and intense refrigerant boiling on start up (intense boiling of refrigerant on start up, often called flooded start, is undesirable as it can damage the compressor internal components) Also if the SMV is fully or nearly fully closed on start up, the suction pressure can drop to extremely low values causing damage to compressor electrical terminals. The SMV, after being opened on start-up, will be throttled again as discussed above with a two-phase refrigerant expanding through the SMV.

These and other features of the present invention can be best understood from the following specification and drawings, the following of which is a brief description.

BRIEF DESCRIPTION OF THE DRAWINGS

FIG. 2c is a P-h diagram showing the beneficial effects of another embodiment, where the use of discharge throttling helps to increase temperature during the compression process.

FIG. 2d is a P-h diagram showing the beneficial effects of turning off or slowing down the condenser fan to increase temperature during the compression process.

DETAILED DESCRIPTION OF THE PREFERRED EMBODIMENTS

Figure 1:
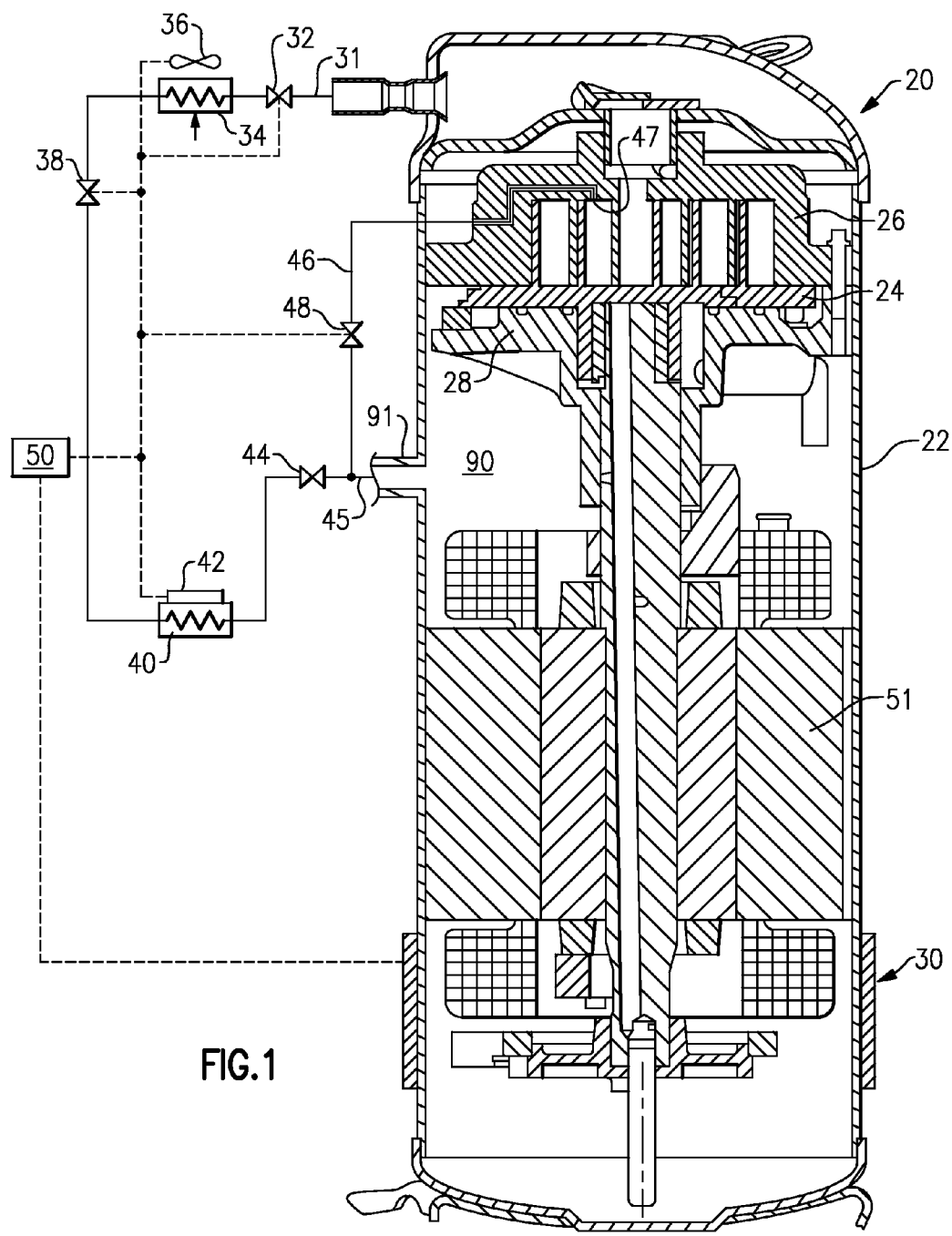
FIG. 1 is a schematic view of a refrigerant system incorporating the present invention.

A refrigerant system 20 is illustrated in FIG. 1, and includes a compressor 22 having an orbiting scroll member 24 and a non-orbiting scroll member 26. A crankcase 28 supports the orbiting scroll 24, as known. While the present invention is disclosed in a scroll compressor, it should be understood that it would extend to any type of compressor, as orbiting scroll member 24 and non-orbiting scroll member 26 can be substituted by other types of compression elements (for example by screws for screw compressors, compression cylinder for reciprocating compressors, or vane and roller arrangement for rotary compressors).

An optional crankcase heater 30 is shown schematically as being attached to compressor 22, and for a purpose to be described below.

A discharge line 31 leaving the compressor 22 includes an optional discharge throttling valve 32. Refrigerant passes through the discharge line 31 to a condenser 34 having a condenser fan 36. The refrigerant then passes through an expansion device 38 and to an evaporator 40. Evaporator 40 is shown having an optional heater 42. A suction modulation valve 44 controls the amount of refrigerant delivering through a suction line 45 back to the compressor 22. A bypass line 46 selectively taps refrigerant from intermediate pressure ports 47 in the compressor 22 and through a valve 48 back to the suction line 45.

A control 50 selectively controls any of the components 44, 32, 36, 30, 48, and 42 that might be part of the system 20 design. In a main feature of this invention, the suction modulation valve 44 is throttled toward a closed position to direct a smaller amount of refrigerant into the compressor 22, when there is a danger of flooded conditions reaching the compressor 22. As an example, after start-up, the suction modulation valve 44 can be throttled towards a closed position in this invention. In this manner, less refrigerant reaches the compressor. The compressor includes a motor 51 that dissipates heat, and will heat the refrigerant in chamber 90 before it reaches the orbiting 24 and non-orbiting 26 scroll compression elements. Since the amount of refrigerant entering the compressor is reduced due to suction throttling, this refrigerant will be pre-heated to a higher temperature (or higher quality) by the dissipated motor heat than if a fully open suction modulation valve 44 were utilized. Any liquid droplets present in the refrigerant when it enters the compressor can "boil off" becoming vapor, thus less liquid droplets will be entering the compression elements due to the inventive control of the suction modulation valve 44.

If additional reduction of the amount of liquid droplets entering the compressor is necessary, then the crankcase heater 30 (normally attached to the outside of the compressor shell in the vicinity of the oil sump) can be installed and activated to further heat the refrigerant entering the compressor. Furthermore the evaporator heater 42 may be turned on by control 50 to provide heating of the refrigerant before it would enter the compressor 22.

To a similar effect, the optional discharge valve 32 can be throttled toward a closed position, or the condenser fan 36 may be slowed or stopped. Either will increase the refrigerant temperature during the compression process, thus reducing the amount of liquid refrigerant present during the compression process.

Finally, the optional unloader valve 48 may be opened to by-pass refrigerant from the intermediate compression point back into the suction line 45. This will tend to heat up the refrigerant in the line 45 before the refrigerant enters the compressor, and thus further cause any liquid to boil off.

Refrigerant returns from the suction line 45 through a suction port 91 in a housing shell for the compressor, and into a chamber 90, which eventually returns the refrigerant back to compression chambers between the orbiting scroll 24 and the non-orbiting scroll 26, as known.

FIG. 2a through FIG. 2d schematically represent P-h charts, showing how different control techniques might increase the refrigerant quality or temperature of the refrigerant. In these Figures, as shown in a notional manner, the compression cycle before the control scheme is implanted is shown as a solid line, and the dotted line indicates the compression cycle after the control technique is being implemented to increase the quality or temperature of the refrigerant passing through the compressor. For example, often when some of the above mentioned strategies implemented, we may expect some of the different changes in the value of evaporator pressure (indicated by line DA) and condenser pressure (indicated by line BC) and some minor shifts in the location of the expansion process (line CD) from what is indicated in the FIGS. 2a through 2e. As for example, the location of the line DA can shift slightly downward from what is shown in FIGS. 2a, 2c, 2d and 2e. Higher refrigerant quality means less liquid droplets present in the refrigerant stream; the quality of 1 represents no liquid droplets at all and quality of "0" represents solid liquid, a quality value between "0" and 1 represents mixture of liquid and vapor).

Figure 2A:
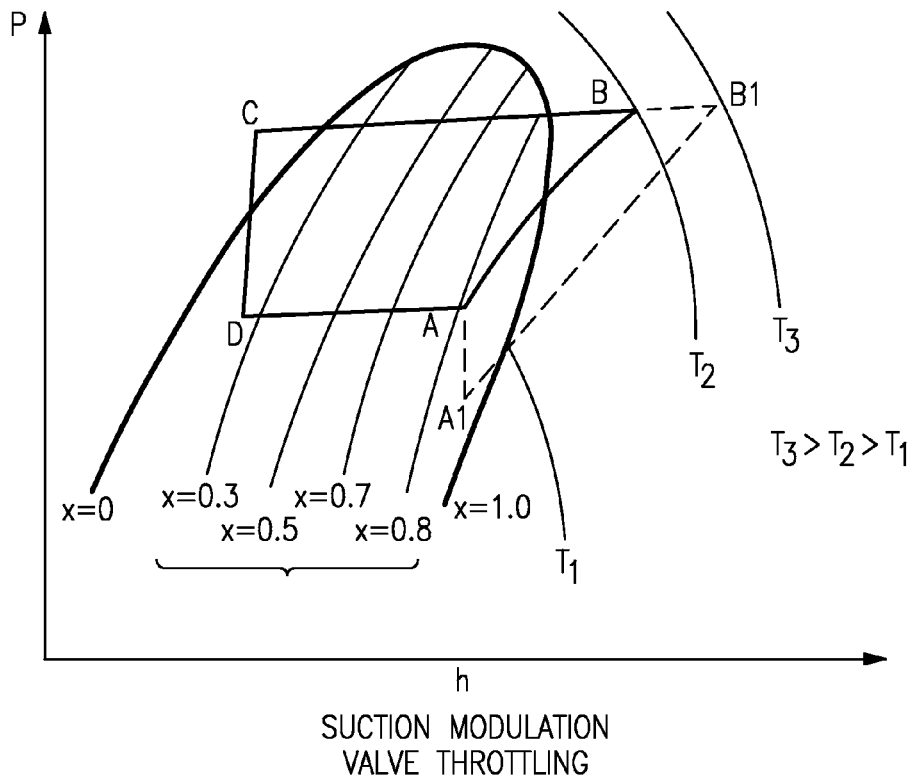
FIG. 2a is a P-h diagram showing the beneficial effects of the main embodiment of the present invention using a suction modulation valve.

FIG. 2a shows how the suction modulation valve throttling increases the refrigerant quality (new point "A1" has a higher quality then the old point "A") Further, as indicated in this Figure, the suction throttling causes an increase in temperature within the compression process resulting in evaporation of liquid droplets (there is higher temperature along the new compression line A1-B1 then along the old compression line A-B for the same corresponding pressures). It should be noted, that temperature during compression process is increased as a result of operating pressure ratio being increased due to reduction of suction pressure.

Figure 2B:
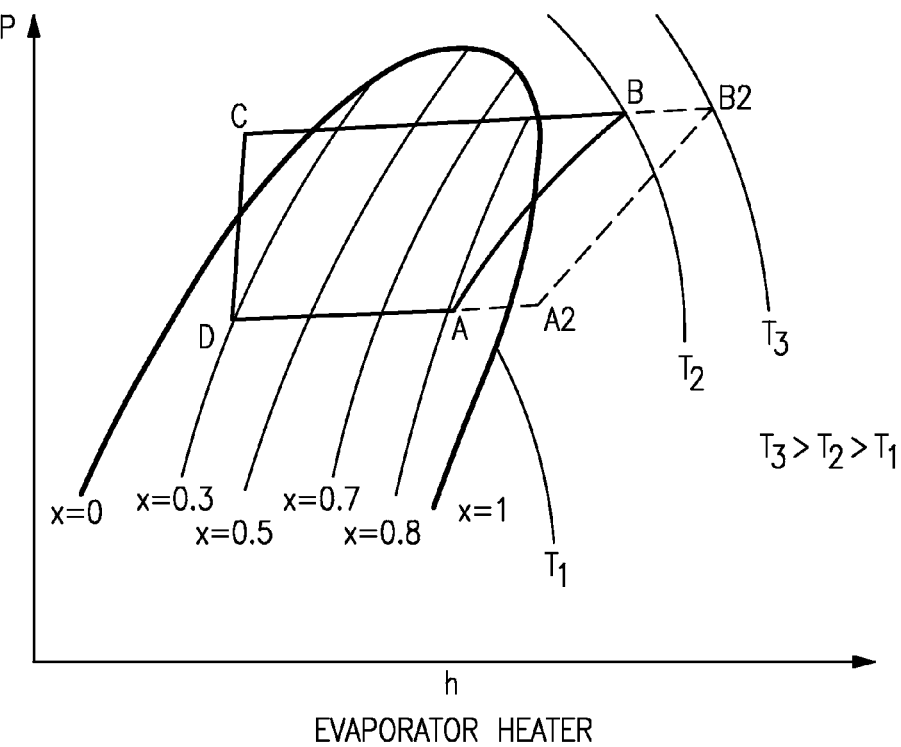
FIG. 2b is a P-h diagram showing the beneficial effect of using evaporator heater to increase the quality of the refrigerant entering the compressor.

FIG. 2b shows how engagement of evaporator heaters causes the refrigerant quality of the refrigerant entering the compressor to be increased, as additional pre-heating of refrigerant by the evaporator heater takes place from point A to point A2.

FIG. 2c shows the beneficial effects of another embodiment, where the use of discharge throttling helps to increase temperature during the compression process (refrigerant temperature and/or quality is higher along the new compression line A-B3 then along the old compression line A-B).

FIG. 2d shows the beneficial effects of turning off or slowing down the condenser fan to increase temperature during the compression process (refrigerant temperature and/or quality is higher along the new compression line A-B4 then along the old compression line A-B).

Figure 2E:
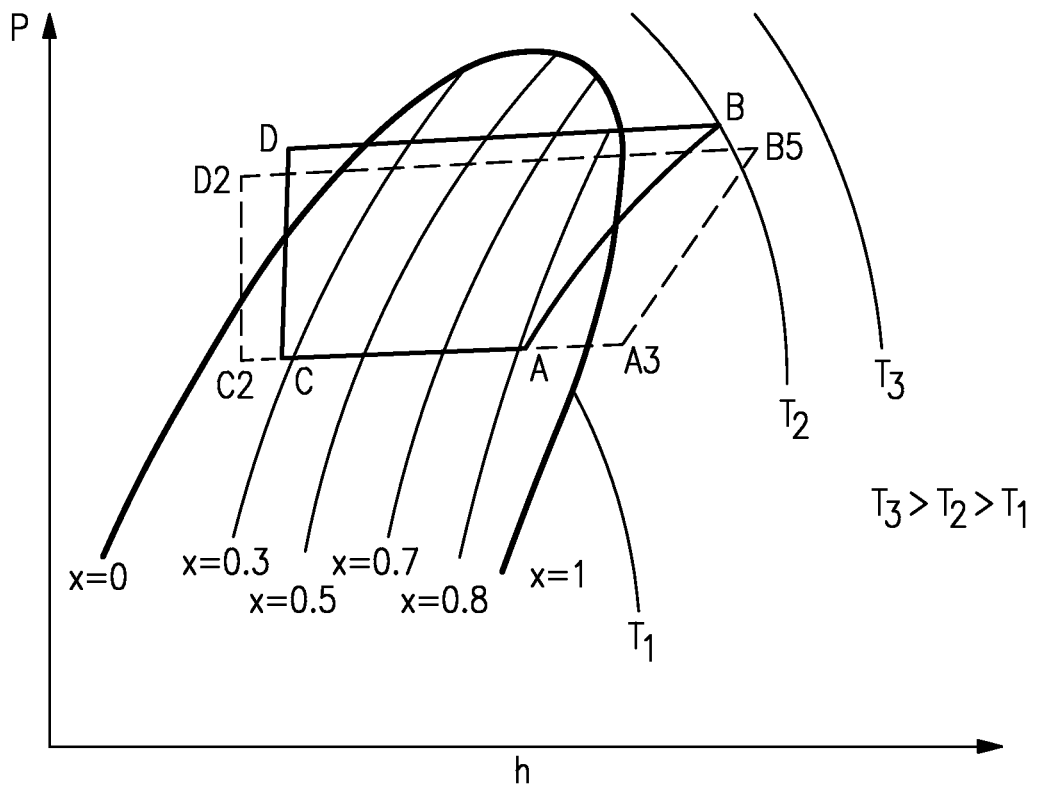
FIG. 2e is a P-h diagram showing the beneficial effects of by-passing refrigerant from intermediate compression point back to suction line.

FIG. 2e is a P-h diagram showing the beneficial effects of by-passing refrigerant from intermediate compression point back to suction line (refrigerant temperature and/or quality is higher along the new compression line A3-B5 then along the old compression line A-B).

It should be noted that the control schemes as shown in FIG. 2a through FIG. 2d can be used independently of each other or in combination with each other. As indicated above these control schemes can be additionally enhanced by utilizing a crankcase heater and/or running compressor in reverse for short period of time.

Also while the above control techniques are suitable for various air conditioning, heat pumps and refrigeration applications. This invention may prove to be especially advantageous for container refrigeration application, and truck trailer refrigeration application, since these systems are often prone to flooding, but on the other hand have sophisticated controls that can be adapted to prevent flooding as described above.

Although preferred embodiments of this invention have been disclosed, a worker of ordinarily skill in this art would recognize that certain modifications would come within the scope of this invention. For that reason, the following claims should be studied to determine the true scope and content of this invention.

What is claimed is:

1. A refrigerant system comprising:
  a compressor, a condenser downstream of said compressor, an expansion device downstream of said condenser, and an evaporator downstream of said expansion device, and a refrigerant circulating from said compressor to said condenser, through said expansion device and said evaporator and then returning to said compressor;
  a control controlling a system component to reduce the amount of liquid refrigerant to pass through the compressor;
  said system component is a suction modulation valve;
  said control throttles said suction modulation valve toward a closed position to reduce mass flow when conditions indicate there might be an undesirable amount of liquid refrigerant to pass through the compressor; and
  a discharge valve is positioned intermediate said condenser and said compressor, and said discharge valve is throttled in combination with said control controlling said suction modulation valve.

2. The refrigerant system as set forth in claim 1, wherein said control throttles said suction modulation valve at start-up.

3. The refrigerant system as set forth in claim 1, wherein said control throttles said suction modulation valve shortly after start up.

4. The refrigerant system as set forth in claim 3, wherein said control throttles said suction modulation valve between 0.1 seconds and 1 second after the start up.

5. The refrigerant system as set forth in claim 1, wherein said control throttles said suction modulation valve during continuous compressor operation.

6. The refrigerant system as set forth in claim 1, wherein said control controlling said suction modulation valve in combination with actuation of a compressor crankcase heater of said compressor.

7. The refrigerant system as set forth in claim 1, wherein said control controlling said suction modulation valve in combination with actuation of a heater on said evaporator.

8. The refrigerant system as set forth in claim 1, wherein said control controlling said suction modulation valve in combination with reducing the speed of a fan associated with said condenser.

9. The refrigerant system as set forth in claim 1, wherein said compressor is run in reverse at start-up in combination with said control controlling said suction modulation valve.

\* \* \* \* \*